Jan. 25, 1966  M. D. MORELLA  3,231,229
INTERLOCKING HUB AND PEDESTAL FOR ORNAMENTAL
LAWN AND GARDEN STATUARY AND THE LIKE
Filed June 1, 1964  3 Sheets-Sheet 1
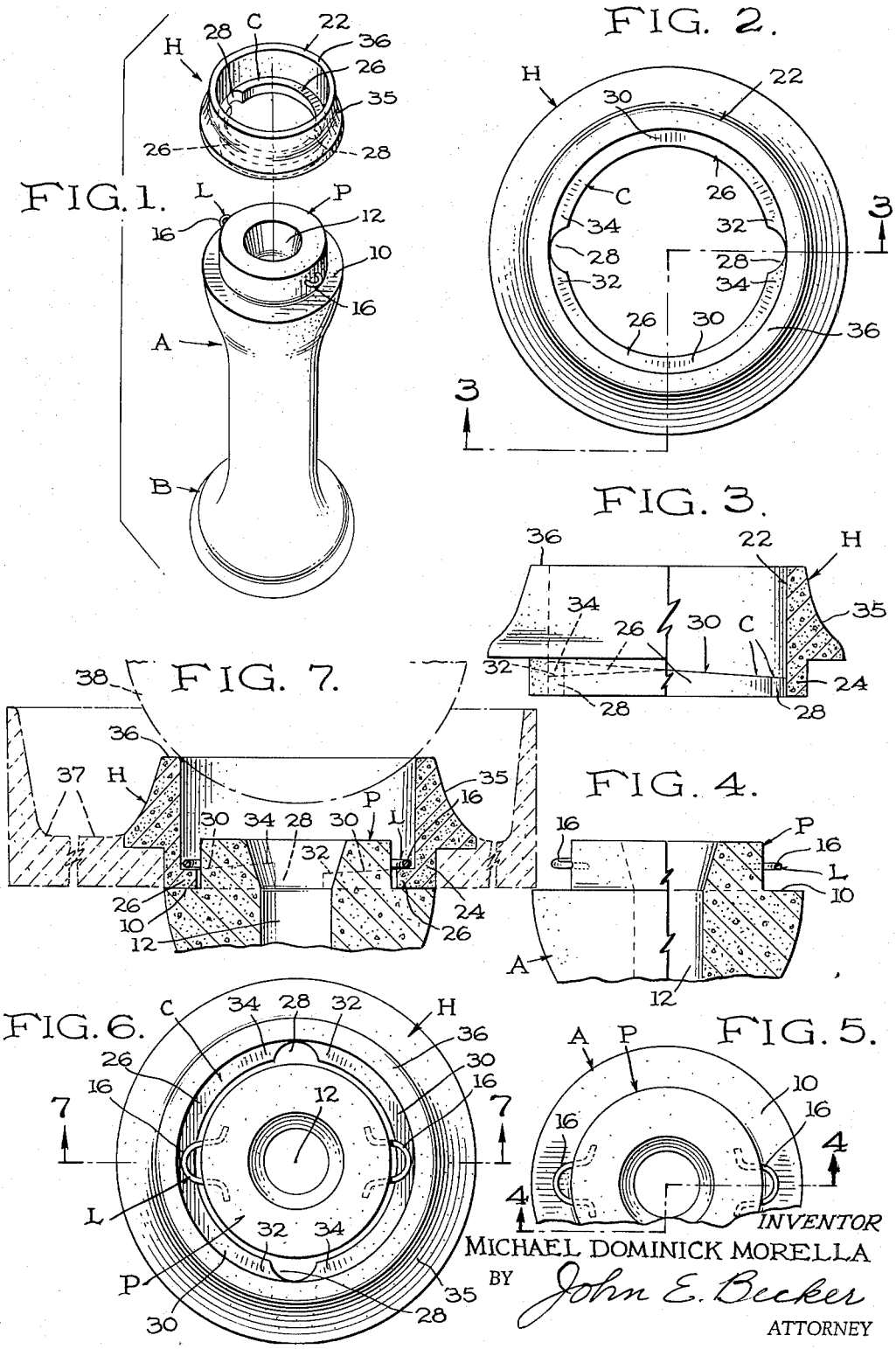
INVENTOR
MICHAEL DOMINICK MORELLA
BY John E. Becker
ATTORNEY Jan. 25, 1966 M. D. MORELLA 3,231,229
INTERLOCKING HUB AND PEDESTAL FOR ORNAMENTAL
LAWN AND GARDEN STATUARY AND THE LIKE
Filed June 1, 1964 3 Sheets-Sheet 2
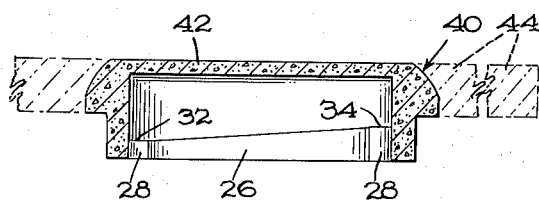
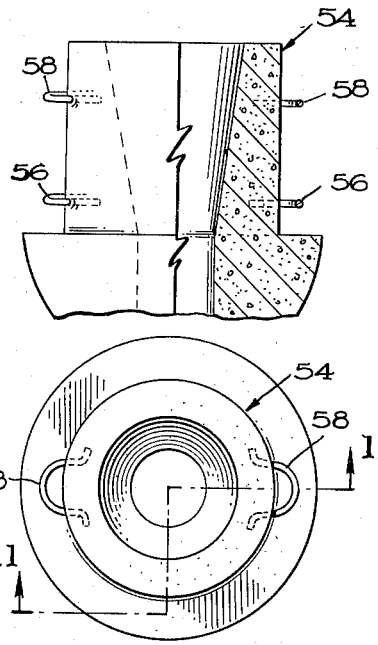
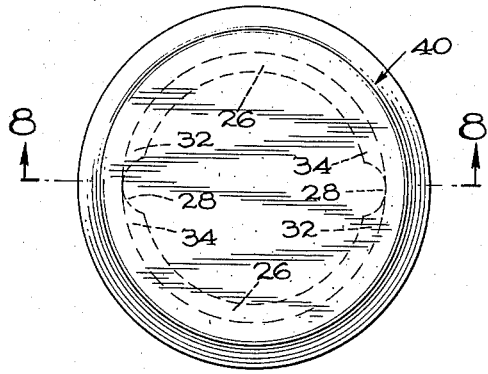
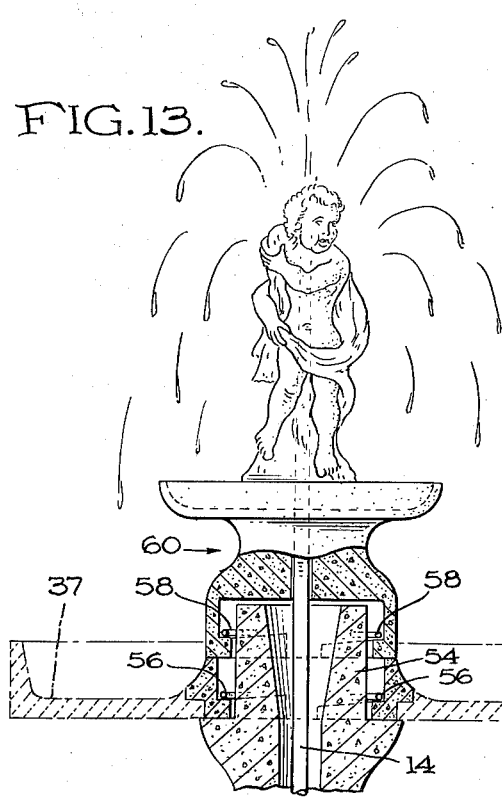
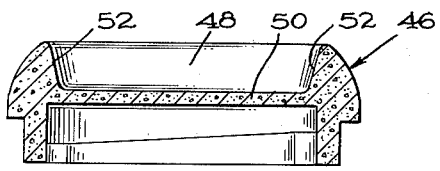
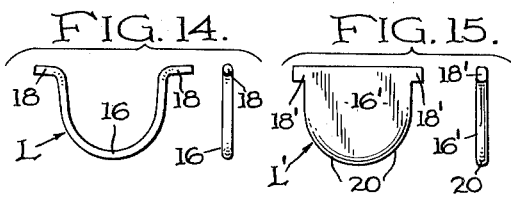
INVENTOR
MICHAEL DOMINICK MORELLA
BY John E. Becker
ATTORNEY Jan. 25, 1966 M. D. MORELLA 3,231,229
INTERLOCKING HUB AND PEDESTAL FOR ORNAMENTAL
LAWN AND GARDEN STATUARY AND THE LIKE
Filed June 1, 1964 3 Sheets-Sheet 3
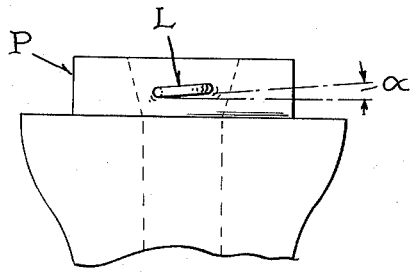
FIG. 16.
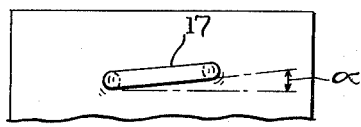
FIG. 17.
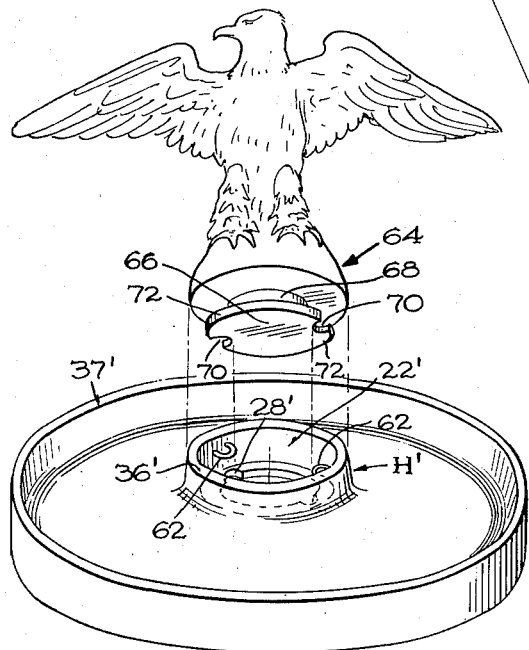
FIG. 18.
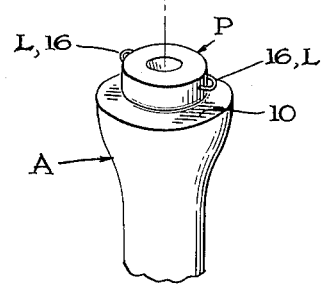
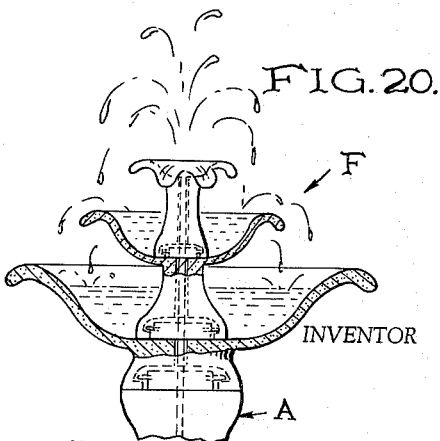
FIG. 19.
FIG. 20.
INVENTOR
MICHAEL DOMINICK MORELLA
BY John E. Becker
ATTORNEY

United States Patent Office 3,231,229
Patented Jan. 25, 1966

3,231,229
INTERLOCKING HUB AND PEDESTAL FOR ORNAMENTAL LAWN AND GARDEN STATUARY AND THE LIKE
Michael Dominick Morella, Corner of Rte. 206 and Sherman Ave., Raritan, N.J.
Filed June 1, 1964, Ser. No. 371,609
9 Claims. (Cl. 248—158)

The present invention relates broadly to a combination hub and supporting structure. More particularly, it relates to an improved composite interlocking statuary hub, which is adapted to be unitarily formed with a garden or lawn ornament, and a supporting pedestal of the type more often used in conjunction with the display of relatively heavy lawn and garden ornaments such as bird baths, gazing balls, mythological, human and animal statuary figures, fountains, lawn tables and the like, as preferably molded or cast from a plastic earthware or cementitious aggregate composition.

Heretofore, lawn ornaments comprisng composite elements, such as a bird bath or various statuary figures as aforementioned, have been usually erected by merely loosely placing the supported article, such as the bird bath tray or the statuary figure, upon the upright extremity or mounting post of the supporting pedestal or standard number. Usually this is affected without having the benefit of readily releasable locking means to preclude the inadvertent or other tipping, upsetting or other dislodgement of the supported article from the pedestal which frequently results not only in damage to and/or destruction of said ornamental articles but also possible serious injury to the erring person or domestic pet.

Accordingly, it is a primary object of this invention to provide an improved means of affecting a positive and readily releasable interlock connection for use with ornamental articles and art statuary of the foregoing class which may be displayed on lawns and in gardens or other display places whether private or public in nature.

More specifically, it is an object of the present invention to provide a composite statuary hub and supporting pedestal wherein the post or upper extremity of the latter is provided with preferably a pair of diametrically disposed, ear-like members or locking lugs projecting radially therefrom and adapted for insertion through and rotative engagement with semi-circular retaining flanges or inclined cam-like surfaces having complementally formed slots therein to permit passage of said lugs therethrough.

Another object is to provide a composite rotary lug and inclined abutment interlock means according to the foregoing objectives, wherein the engaging lugs or ears are fabricated of a somewhat malleable, yieldable or semi-resilient material such as a soft metal or plastic material with rounded edges, to preclude undue gouging, chipping or other unnecessary wear to the cam-like surfaces or retaining flanges which are usually integrally cast or molded from a material such as a cementitious aggregate or the like with the hub member.

Still another object is to provide a novel and useful hub, of the aforementioned character, which is universally adaptable for unitary or integral fabrication with a variety of decorative and functional lawn or garden ornments, all of which are adaptable to be selectively, interchangeably mounted in a positive manner with the aforesaid complemental supporting pedestal. Additionally, some of the hubs may be provided with vertically spaced sets of ears and/or retaining flanges adaptable for cooperative interengagement with complementary flanges and/or ears formed respectively on the upper portion of said pedestal and lower base portion of yet another decorative article to be attached in superimposed or stacked relationship thereon.

A further object is to provide an improved supporting pedestal adaptable for useful cooperation with both decorative and functional art statuary or lawn ornaments according to the preceding objectives, which provides additional means for affording positive but quickly releasable mounting of a plurality of said articles to the pedestal in composite stacked form.

Still a further object is to provide a composite hub and pedestal of the interlocking type, according to the preceding objectives, which is simple in nature, relatively inexpensive to manufacture, yet sturdy, durable and dependable in form and operation.

These and other objects and advantages will become more apparent from the following detailed description, taken in conjunction with the accompanying illustrative drawings wherein:

FIG. 1 is a perspective exploded view of one form of hub and pedestal of the present invention;

FIG. 2 is an enlarged top plan view of one form of hub showing details of the interlocking means;

FIG. 3 is a detailed view partially in elevation and partially in cross-section as taken substantially on line 3—3 of FIG. 2;

FIG. 4 is a view partially in elevation and partially in cross-section as taken substantially on line 4—4 of FIG. 5, but of the fragmentary upper portion of a supporting pedestal having complemental interlocking means for cooperation with the means on the hub shown in FIGS. 2 and 3;

FIG. 5 is a fragmentary top plan view showing the detail of the upper portion of the pedestal shown in FIG. 4;

FIG. 6 is a top plan view showing the hub and pedestal interlocking means in assembled condition;

FIG. 7 is a detailed cross-sectional view of the assembly of FIG. 6 as taken on line 7—7 thereof; and additionally showing in broken lines a fragmentary portion of a bird bath tray or similar articles as can be fabricated either integrally or unitarily in conjunction with said hub;

FIG. 8 is a detailed cross-sectional view of a modified hub as taken on line 8—8 of FIG. 9;

FIG. 9 is a top plan view of the modified hub shown in FIG. 8;

FIG. 10 is a detailed cross-sectional view of still a different modified hub;

FIG. 11 is a view similar to FIG. 4 but fragmentarily showing a modified pedestal having dual interlocking means as taken on line 11—11 of FIG. 12;

FIG. 12 is a top plan view of the modified pedestal of FIG. 11;

FIG. 13 is a view partially in cross-section and partially in elevation showing a detailed assembly of a plurality of ornamental or statuary articles as mounted in interlocked fashion with the pedestal means shown in FIG. 11;

FIG. 14 is a composite plan and side elevation detail view of one form of interlocking lug means for unitary fabrication with the upper portion of a pedestal according to the present invention;

FIG. 15 is a composite plan and side elevation detail view of a modified form of lug means for unitary fabrication with the upper portion of a pedestal according to the present invention;

FIG. 16 is an elevational view of the upper portion of a pedestal showing an inclined or angular disposition of the lug means;

FIG. 17 is an enlarged fragmentary elevational view of the modified angularly disposed lug means of FIG. 16;

FIG. 18 is an exploded perspective view including an article having a modified hub mounting means enabling a plurality of decorative articles to be stacked in interlocking relationship upon a pedestal;

FIG. 19 is an enlarged fragmentary perspective view of still a different hub portion adaptable for mounting on the aforementioned pedestal and for receiving another article in stacked interlocking relationship as shown fragmentarily in exploded or pulled-apart relation thereto; and FIG. 20 is a fragmentary side elevational view depicting a composite stacked arrangement of a plurality of tiers as would be used in a fountain, in which the tiers are provided with complemental interlocking lug and cam means at their respective opposite ends.

Reference will now be made to the drawings wherein like reference characters denote like parts throughout the corresponding figures of the specification. FIG. 1 is illustrative of a disassembled pedestal A including base B, an upright mounting boss or post P having lug means L, adaptable for complementally receiving an annular hub H provided with lug-engaging cam means C around the inner periphery thereof.

More specifically, referring to FIGS. 1–7, pedestal A, which may be of varying shapes and sizes, is preferably integrally cast or molded with a generally cylindrical mounting post P at its upper portion, in which the lug means L is embedded in the cementitious aggregate or other composition from which the articles are made. The pedestal A is further provided, adjacent the base of the mounting post P, with an annular shoulder 10 which is disposed generally normal to the upright post in a substantially horizontally plane and provides an annular seat upon which a hub-mounted ornamental article is supported. The pedestal A is preferably provided with an axially extended aperture 12 throughout its length and adaptable to accommodate either a ground-embedded anchor post (not shown) and/or a vertical conduit 14 for use with a fountain type display, as depicted in FIG. 13.

The post P projects upwardly above seat 10 a distance to sufficiently provide a solid anchorage for lug means L, the latter of which in the embodiment shown in FIGS. 1–7, comprises at least a pair of generally U-shape elements 16, 16, preferably diametrically disposed in substantially a common plane. Lug elements 16, 16 are embedded within post P and spaced a distance above seat 10 to accommodate therebeneath a portion of the lug-engaging flanges or cams C of the hub H, as shown in FIG. 7.

FIG. 14 more clearly illustrates the details of one form of the lug elements 16, which are preferably provided with angularly disposed ends 18 which serve to more positively anchor the same within the aggregate composition of post P. Although ends 18, 18 are shown disposed in the same plane as the U-shape body 16, it is understood that they may be angularly disposed in a different plane, not shown. It is important that lugs 16 be preferably made of a relatively soft malleable metal or similar material having rounded edges such as eleven gauge copper wire. Brass or any other malleable material which is substantially chemically inert in the presence of the concrete or other aggregate may also be used for the lugs, including various plastics of a non-brittle character. For example, it would not be feasible to make the lug elements 16 of hard steel or plastic having sharp edges as they would have a tendency to gouge or otherwise cause unnecessary wear on the locking flanges or cams C, the latter of which are preferably and usually integrally formed with the hub and hub mounted article of the same aggregate, such as concrete, as are the post P and pedestal A. The surface areas of the lug elements 16 which come in contact with said cams C must be smoothly curved or rounded in the contact areas to avoid said gouging.

Referring momentarily to FIG. 15, there is depicted a variation of lug element designated 16' of generally semi-circular leaf form and having anchor projections 18', 18'. The edges 20, which are adaptable to engage the cam means C, are rounded and smooth for the same reasons described above with regard to lug elements 16.

Referring now to the hub member H as illustrated in FIGS. 1, 2, 3, 6 and 7, said member basically comprises an annular sleeve body 22 preferably having integrally formed therewith the said locking cam means C adjacent its inner and lowermost periphery 24. Said cam means C includes a pair of generally semi-circular lug-retaining flanges 26, 26 which project radially inwardly from the lower portion 24 of sleeve-like body 22. Said flanges 26, 26 are diametrically separated by a pair of arcuate notches 28, 28, which are adapted for passage therethrough of the ear-like lug elements 16, 16 on the post P. The flanges 26, 26 have inclined upper camming surfaces 30 with the lowest point 32 of one of the flanges disposed oppositely adjacent the highest point 34 of the opposite flange as separated by said notches 28, 28. Said flanges 26 are of a height whereby the lowest points 32 readily fit beneath said lugs 16, and increase progressively in height and inclination to the highest points 34, which are of a height in excess of that by which the lug elements 16 are spaced from shoulder or seat 10, whereby the medial portions of said inclined flanges average a height, relative to the shoulder 10, corresponding generally to the distance by which said elements 16 are spaced from said shoulder seat 10. The sleeve body 22 is also preferably provided with a convex flared or skirted portion 35 which terminates intermediate the top 36 and the lowermost end 24 of sleeve body 22, as shown more clearly in FIGS. 3 and 7, upon and to which the decorative article may be united, as by integrally molding or casting or by cementing the same unitarily thereto.

Accordingly, when the hub H, to which a lawn ornament or statuary article is adapted to be unitarily and preferably integrally fabricated, is placed upon the post P with the notches 28, 28 aligned with corresponding ear-like lugs 16, 16, said hub H is seated upon shoulder 10 and subsequently is rotated approximately 90° or as much as necessary to effect a snug and positive interlock responsive to the relative rotation between hub H and pedestal A.

A typical bird bath tray 37, which is illustrative of an article adapted to be unitarily formed with a hub, is shown in broken lines in FIGS. 7 and 13. Also, fragmentarily shown in broken lines in FIG. 7, there is a gazing ball 38 which is adaptable to be placed upon the upper and open end of the hub H, thereby closing said opening and protecting the interlocking means from the climatic elements, and particularly the adverse effects which may be caused by water and snow precipitation in freezing climates.

FIGS. 8 and 9 are directed to a modified and truncated form of hub 40, which is provided with the same type of cammed lug-retaining flanges 26 as described in the foregoing, but which is provided with a closed horizontal upper wall 42 providing a seat, as for a flower pot, or a continuous surface which may be coplanar with a unitarily formed article such as a lawn table fragmentarily designated at 44 in broken lines of FIG. 8.

FIG. 10 is illustrative of still another modified hub structure designated 46 which is generally identical to that of FIG. 8, except for a stepped-down or sunken depression 48 defined by a horizontally disposed wall 50 and an outwardly tapered annular side wall 52. This hub will also afford protecton to the interlock elements, as well as provide a central receptacle within which a gazing ball, a plant, or other ornamental article may be received.

Proceeding to FIGS. 11 and 12, there is depicted a different embodiment of a post 54 shown in conjunction with a fragmentarily illustrated pedestal, said post being provided with two sets of aligned but vertically spaced ear-like lugs, a lower set 56, 56 and an upper set 58, 58. Said lugs are shown as being of the form shown in FIG. 14. The sets of lugs preferably are similarly arranged in diametrically opposed relation, as previously described in the first embodiment, and are vertically spaced a predetermined distance apart to accommodate a plurality of articles, such as a bird bath tray 37 or the like, mounted in conjunction with the lower set of lugs 56, 56, and an article of art or fountain statuary, indicated generally at 60 in FIG. 13, mounted in conjunction with the upper set of lugs 58, 58.

In this latter relationship the upper edge 36 of the hub H serves as an intermediate support for the second article 60.

It is to be further understood that the ears or lugs L may be initially embedded within the mounting post P at an inclined angle designated α which corresponds generally to the inclination of the cam surfaces of the flanges 26, 26, as illustrated in FIG. 16. FIG. 17 depicts, on a slightly enlarged scale, a lug or ear 17 which has been mounted at the said angle of inclination, as just described relative to FIG. 16.

The latter angular disposition of said lugs is preferred to give a more complete and stable engagement and resultant better interlock of the complementary lug and retaining flange members.

Because of the preferred malleable character of the lugs, they will inherently tend to more closely conform to the preferred angular disposition as a result of the first few interengagements thereof. Further if after repeated use the lugs tend to become somewhat angularly displaced upward resulting in a somewhat looser-than-desired interlock, the lugs may be manually bent back to their initial and preferred position, due to the said malleability thereof.

Proceeding to the embodiment disclosed in FIG. 18, the pedestal A is the same as previously described, while the hub H', shown preferably integrally formed with a bird bath basin or tray 37', is different from the form of hub H only to the extent that it additionally includes a set of spaced lugs 62, 62, preferably integrally embedded in sleeve body 22' in vertically aligned but spaced relationship to the arcuate notches 28', 28'. It is apparent from the illustration in FIGURE 18, that the purpose of the lugs 62, 62 is to releasably interlock still another decorative or statuary article 64 thereto by means of the similarly notched mounting base 66 formed thereon. Said base 66 is of a diameter slightly less than the inside diameter of the hub H' and depends in spaced relationship from the main body portion of the article 64 by means of a connecting neck 68 of reduced diameter to permit clearance of lugs 62, 62 when they cooperatively pass through the complementally formed notches 70, 70 in base 66. The notches 70, 70 serve to define the base 66 into a pair of retaining flanges 72, 72 which effectively interlock the article 64 to the hub H' of article 37' in a manner similar to that in which article 37' is secured to the pedestal A, as when the article 64 is then rotated about its vertical axis.

The embodiment shown in FIG. 19 depicts a reverse fabrication of the lugs 62', 62' and the flanges 72', 72' as separated by notches 70', 70' formed respectively on the article 64' and the hub H'', while the interlocking principle remains the same as previously described.

In both of the latter FIG. 18 and FIG. 19 embodiments, the flanges 72, 72 or 72', 72' may be provided with inclined camming surfaces and the retaining lugs 62, 62 or 62', 62' correspondingly disposed in inclined relationship to provide for maximum stable engagement of the composite articles, as aforesaid.

FIG. 20 is illustrative of a composite tiered fountain F, wherein each of the tiers is provided with an integrally formed mounting hub or pedestal provided with the base mounting flanges at its lower portion for cooperation with the lugs carried on a mounting boss or post portion of the upper central portion of each tier hub, according to the aforedescribed structure, which may or may not be supported upon a separate pedestal A, depending upon the environment in which it is to be used.

Accordingly, from the foregoing description, it is apparent that an improved composite interlocking hub and pedestal of the character described has been evolved which achieves all of the objectives and advantages as set forth in the preamble of this specification.

While specific forms and embodiments of the present invention have been described in detail, various other changes and alterations may be made, such as embodying sets of three equally spaced lugs instead of two diametrically opposed lugs, or providing more than two sets of vertically spaced lugs on a pedestal post, without departing from the spirit and scope of the invention as defined in the appended claims.

I claim:

1. A hub and pedestal combination of the class described comprising:
    (a) a vertically disposed pedestal having an upper portion including hub-mounting means;
    (b) an annular hub adapted to have a decorative article or lawn ornament mounted thereon, and having a generally flat base adaptable for cooperative mounting with said hub-mounting means;
    (c) complemental interengaging means provided respectively on said hub-mounting means and on the hub for releasably interlocking the hub to the pedestal responsive to relative rotation therebetween including:
        (1) a pair of circumferentially spaced-apart projections extending radially outward from the hub-mounting means of the upper portion of the pedestal above said base;
        (2) a pair of radially inturned annular retaining flanges on the inner periphery of said hub;
        (3) said flanges being circumferentially spaced apart to accommodate passage therebetween of the aforesaid projections and having surfaces inclined with respect to the base of said hub which surfaces cooperatively engage with and beneath said projections responsive to relative rotation between said hub and pedestal; and
        (4) said projections being respectively inclined for complemental, positive and substantially complete engagement with said respective inclined surfaces of the retaining flanges.

2. A combined article-supporting pedestal means and a hub-mounted ornamental lawn article means of the class described adapted for composite assembly comprising:
    (a) a pedestal including vertically-disposed column-type body having an upper portion;
    (b) said upper portion of the body including a supporting shoulder;
    (c) a mounting post projecting upwardly from said supporting shoulder;
    (d) circumferentially spaced semi-resilient U-shape lug means projecting outwardly from said post and in spaced relation above said shoulder;
    (e) the hub mounted ornamental lawn article includes (1) an annular hub body having an inner peripheral wall; and (2) said hub body having a pair of circumferentially spaced hub-retaining flanges projecting inwardly from said inner peripheral wall for cooperative interlocking engagement with said lug means on the pedestal.

3. A composite decorative and functional lawn or garden article of the class described comprising (a) a plurality of superimposed interlocking tiers;

(b) each of said tiers including lower and upper complemental base mounting means; wherein (c) the lower base mounting means of each tier comprises inclined cam ways and the upper base mounting means comprises complemental spaced lug means for interlocking engagement with subjacently disposed cam ways.

4. A hub and pedestal combination of the class described comprising (a) a vertically disposed pedestal having an upper portion including hub-mounting means;

(b) an annular hub adapted to have a decorative article or lawn ornament mounted thereon and for cooperative mounting with the hub-mounting means of the pedestal;

(c) complemental interengaging means provided respectively on the pedestal hub-mounting means and on the hub for releasably interlocking the hub to the pedestal responsive to relative rotation therebetween;

(d) said complemental interengaging means comprising at least two sets of at least two radially disposed locking lugs projecting radially outward from the hub-mounting means of the upper pedestal portion; and (e) each set of lugs being disposed vertically apart a predetermined distance and adaptable to complementally receive a corresponding hub-mounted article for each respective set of lugs, thus providing for a composite mounting of a plurality of hub-mounted articles on a single pedestal.

5. An article-supporting pedestal for composite assembly with a hub-mounted ornamental lawn article of the class described, comprising (a) a vertically-disposed column-type body having an upper portion;

(b) said upper portion of the body including a supporting shoulder;

(c) a mounting post projecting upwardly from said supporting shoulder; and (d) means on said post adaptable for interlocking engagement with at least one hub-mounted ornamental lawn or garden article; and (e) wherein said latter means on said post include a plurality of sets of lugs projecting radially outward from said post in vertically spaced-apart relation from each other and above said shoulder, and respectively adaptable for interlocking engagement with a corresponding plurality of hub-mounted ornamental articles.

6. An article-supporting hub-structure adapted to have mounted therewith an ornamental lawn article or the like, and being further adapted for composite assembly with a supporting pedestal, comprising (a) an annular generally cylindrical sleeve body having an open base and top end;

(b) means adjacent the base on the inner periphery for interlocking engagement with complemental means provided on said supporting pedestal;

(c) means near the top end of said body for interlocking engagement with complemental means formed on another ornamental article to be superimposed thereon; and (d) wherein the means near the top end of said body include radial, spaced projections disposed in vertically spaced-apart relation from the aforesaid means disposed adjacent the base of said hub.

7. A combined article-supporting hub structure means and supporting pedestal means adapted for composite assembly with each other and with another ornamental lawn article or the like, wherein the hub structure means comprises (a) an annular generally cylindrical sleeve body having an open base and open top end;

(b) said body having a height not in excess of its diameter;

(c) complemental interlocking means provided on the hub structure means and on the pedestal means;

(d) the interlocking means of the hub structure means comprising a pair of circumferentially spaced, radially inturned flanges disposed adjacent the base on the inner periphery thereof and having non-parallel lower and upper surfaces;

(e) the lower surfaces being substantially co-planar with said base; and (f) each of the upper surfaces being progressively inclined along the periphery thereof in a generally spiral-like manner relative to the base; and (g) said upper surfaces having opposed terminal edges defined by the aforesaid circumferential spacing thereof, which are of unequal heights due to the aforesaid inclined disposition thereof.

8. An article-supporting hub structure means and supporting pedestal means adapted for composite assembly with each other and with an ornamental lawn article or the like, wherein the hub structure means comprises (a) an annular generally cylindrical sleeve body having an open base and open top end;

(b) said body having a height not in excess of its diameter;

(c) complemental interlocking engagement means provided respectively on the hub structure means and on the pedestal means including radially directed flange means disposed adjacent the base on the inner periphery of said body for cooperation with said engagement means on the pedestal means;

(d) means near the top end of said body for composite interlocking engagement with complemental means on an ornamental lawn article when superimposed thereon; wherein (e) said means near the top end comprise circumferentially spaced, radial projections disposed in vertically spaced-apart relation from the aforesaid means disposed adjacent the base of said hub body.

9. A hub and pedestal combination of the class described comprising:

(a) a vertically disposed pedestal having an upper portion including hub-mounting means;

(b) an annular hub adapted to have a decorative article or lawn ornament mounted thereon, and having a generally flat base adaptable for cooperative mounting with said hub-mounting means;

(c) complemental interengaging means provided respectively on said hub-mounting means and on the hub for releasably interlocking the hub to the pedestal responsive to relative rotation therebetween including:

(1) a pair of circumferentially spaced-apart projections extending radially outward from the hub-mounting means of the upper portion of the pedestal above said base;

(2) a pair of radially inturned annular retaining flanges on the inner periphery of said hub; and (3) said flanges being circumferentially spaced apart to accommodate passage therebetween of the aforesaid projections and having surfaces inclined with respect to the base of said hub which surfaces cooperatively engage with and beneath said projections responsive to relative rotation between said hub and pedestal.

References Cited by the Examiner

UNITED STATES PATENTS

| | | | |
|---|---|---|---|
| 1,653,897 | 12/1927 | Farr | 248—158 X |
| 1,928,799 | 10/1933 | Stevens | 47—39 |
| 2,099,329 | 11/1937 | Comstock et al. | 47—41.1 |
| 2,331,488 | 10/1943 | Madsen | 108—150 |
| 2,488,924 | 11/1949 | Meierjohan et al. | 47—41.1 |
| 2,954,953 | 10/1960 | Mallet-Prevost | 248—158 |
| 3,027,670 | 4/1962 | Kramer et al. | 248—159 X |
| 3,119,588 | 1/1964 | Keats | 248—158 |

FOREIGN PATENTS 839,888  5/1952  Germany.

CLAUDE A. LE ROY, *Primary Examiner.*

J. PETO, *Assistant Examiner.*